US008331568B2

(12) United States Patent
Ferguson (10) Patent No.: US 8,331,568 B2
(45) Date of Patent: Dec. 11, 2012

(54) EFFICIENT DISTRIBUTION OF COMPUTATION IN KEY AGREEMENT

(75) Inventor: Niels Thomas Ferguson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 772 days.

(21) Appl. No.: 12/474,265

(22) Filed: May 28, 2009

(65) Prior Publication Data

US 2010/0306525 A1   Dec. 2, 2010

(51) Int. Cl.
*H04L 9/00* (2006.01)
*H04L 9/08* (2006.01)
*H04L 9/30* (2006.01)
*H04L 9/32* (2006.01)
*H04L 29/06* (2006.01)

(52) U.S. Cl. ............ 380/285; 380/30; 380/44; 380/259; 380/282; 713/151; 713/156; 713/171; 713/175; 713/176

(58) Field of Classification Search .................. None
See application file for complete search history.

(56) References Cited

U.S. PATENT DOCUMENTS

| | | | |
|---|---|---|---|
| 5,825,890 A | 10/1998 | Elgamal et al. | |
| 6,094,485 A * | 7/2000 | Weinstein et al. | 380/30 |
| 6,189,098 B1 | 2/2001 | Kaliski, Jr. | |
| 6,219,420 B1 * | 4/2001 | Hardy et al. | 380/2 |
| 6,233,617 B1 * | 5/2001 | Rothwein et al. | 709/227 |
| 6,249,873 B1 | 6/2001 | Richard et al. | |
| 6,584,567 B1 | 6/2003 | Bellwood et al. | |
| 6,968,060 B1 * | 11/2005 | Pinkas | 380/277 |
| 7,082,534 B2 * | 7/2006 | Tardo | 713/161 |
| 2001/0042051 A1 * | 11/2001 | Barrett et al. | 705/65 |
| 2006/0294366 A1 * | 12/2006 | Nadalin et al. | 713/156 |
| 2007/0263874 A1 | 11/2007 | Harran et al. | |

OTHER PUBLICATIONS

Cobb, Michael, "Securing Public Key Transport", retrieved at <<http://searchsecurity.techtarget.com/expert/KnowledgebaseAnswer/0,289625,sid14_gci1113012,00.html>>, Aug. 6, 2005, pp. 1-3.
"Wireless Sync Security Overview (Hosted Server)", retrieved at <<http://www.wsync.com/resources/PDF/WP_WSSO.pdf>>, dated 2007, pp. 1-6.
Feige, et al., "Zero Knowledge Proofs of Identity", Proceedings of the Nineteenth Annual ACM Symposium on Theory of Computing STOC '87, dated 1987, pp. 210-217, New York.
Guillou, et al., "A Practical Zero-Knowledge Protocol Fitted to Security Microprocessor Minimizing Both Transmission and Memory", Lecture Notes in Computer Science on Advances in Cryptology-Eurocrypt'88 (Davos, Switzerland), dated 1988, pp. 123-128, Springer-Verlag, New York.
Freier, et al., "The SSL Protocol Version 3.0", retrieved at <<http://www.mozilla.org/projects/security/pki/nss/ssl/draft302.txt>>, dated Nov. 18, 1996, 58 pages.
Dierks, et al., "The Transport Layer Security (TLS) Protocol Version 1.1", retrieved at <<http://tools.ietf.org/html/rfc4346>>, dated Apr. 2006, 88 pages.
Menezes, et al., "Handbook of Applied Cryptography", dated 1997, pp. 385-424, CRC Press, Boca Raton.

* cited by examiner

*Primary Examiner* — Philip Chea
*Assistant Examiner* — Fatoumata Traore (57) ABSTRACT

In Transport Layer Security (TLS) or other communication protocols, the load on the server may be lowered by reducing the number of expensive decryption operations that the server has to perform. When a client contacts a server, the client sends the server the client's public key. The server chooses a secret value, encrypts the value with the client's public key, and sends the encrypted value to the client. When the client decrypts the secret, the server and client share a secret value, which may be used to derive an encryption key for further messages. In many key agreement schemes, the client chooses and encrypts the secret value, and the server recovers the value with an expensive decryption operation. By instead having the server choose the value and send it to the client, an expensive decryption operation is redistributed from the server to the client, thereby freeing server resources.

18 Claims, 5 Drawing Sheets

EFFICIENT DISTRIBUTION OF COMPUTATION IN KEY AGREEMENT

BACKGROUND

Transport Layer Security (TLS) and its predecessor, Secure Sockets Layer (SSL), are cryptographic protocols that provide security and data integrity for communications over networks such as the Internet. A communication session over TLS or SSL has two distinct phases. In the first phase, a client and a server set up a shared secret key and perform authentication. (Normally, authentication is one-way—i.e., the client authenticates the server, but not vice versa—although TLS and SSL also support two-way authentication.) In the second phase, the shared secret key is used to encrypt and/or authenticate data that is transmitted between the client and server.

Normally, agreement on the shared secret between the client and the server is performed, during the first phase, by the following procedure. After the client and server exchange initial "hello" messages, the server sends its certificated public key to the client. The client then chooses a value, x, and uses the server's public key to encrypt a message that contains x. The server then uses its private key to decrypt the message and to recover x from the message. Once the server and client both have knowledge of x, either they use x as the shared secret key, or they derive the shared secret key from x using an algorithm that is known to both the client and the server.

A problem that arises in this key agreement procedure is that the procedure involves decryption, by the server, of the message that contains x. TLS/SSL supports many cipher suits that can use a variety of different encryption/decryption techniques. (The cipher suite is agreed to between the client and server as part of their "hello" messages, before the key agreement part of the first phase takes place.) However, in a typical TLS/SSL communication, the chosen cipher suite uses Rivest-Shamir-Adelman ("RSA") public key encryption to perform key agreement. RSA encryption can be performed relatively efficiently, but RSA decryption is computationally expensive. Thus, for every TLS/SSL connection, the server has to perform an expensive RSA decryption. If the server processes hundreds or thousands of connections per minute, key agreement that involves RSA decryption can create a bottleneck on the server. Many servers use a significant portion of their available processing capacity doing RSA decryption as part of the key agreement protocol.

SUMMARY

TLS/SSL may be extended or modified so as to allow key agreement to take place through a protocol that attempts to relieve the server of the task of performing expensive RSA decryption. In such a protocol, the client sends its public key to the server. The server then chooses a value, x, and encrypts x with the public key that the client provided. The server also sends the client the server's public key, a certificate of that key, and a digital signature calculated over the encrypted x and some data that the server receives from the client. The client then validates the certificate on the server's public key, uses the server's public key to verify the signature, and uses the client's private key to decrypt x. With x now being known both to the client and to the server, the value x (or some other value that the client and server derive from x) can then be used as a shared secret for further encryption of data.

One implementation issue that arises in the above-mentioned key agreement procedure is that TLS/SSL does not directly support the sending of the client's public key during the initial "ClientHello" message. However, there are various ways that this key agreement procedure can be deployed. The ClientHello message does support a field in which arbitrary data can be sent, and this field can be used by the client to transmit its key. In another example, the TLS/SSL protocol could be modified to support, explicitly, the sending of a public key by the client.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

TLS, and its predecessor SSL (collectively referred to herein as "TLS/SSL"), are protocols that are used to provide security and data integrity in communications. TLS/SSL is widely used in communications between web clients and servers on the Internet. For example, sensitive information such as credit card numbers, passwords, etc., are normally transmitted using TLS/SSL.

In general, TLS/SSL works by setting up a shared secret key between a client and a server, and then using the shared secret key to transmit encrypted and/or authenticated data between the client and the server. A TLS/SSL session begins with a phase in which the client authenticates the server, and in which the client and server agree on the shared secret key to be used for further communication. (TLS/SSL supports bilateral authentication in which the server authenticates the client, although in practice this form of authentication is rarely used. In typical TLS/SSL communications, the only authentication that takes place is that of the server by the client.)

TLS/SSL is flexible in the sense that it supports many different cipher suites, which implement a variety of cryptographic algorithms and key-agreement procedures. In practice, however, the following procedure is the one that is used. The client sends a ClientHello message. The ClientHello message includes, among other things, an identification of the cipher suite(s) that the client requests to use for communication (typically a list of all the cipher suites that the client supports). Typically, the cipher suite(s) supported by the client include a suite that uses RSA encryption for the key exchange. After the server receives the ClientHello message, the server determines which one(s) of the cipher suites listed in the message are supported by the server, and the server then chooses one of these suites. The server then sends the client a ServerHello message which includes, among other things, an identification of the cipher suite to be used. In practice, the cipher suite that is chosen often is one that uses RSA-based key exchange.

Assuming that the chosen cipher suite uses the RSA key exchange procedure, the server next sends its RSA public key and a certificate chain (e.g., a list of X.509 certificates) that trace the pedigree of the public key to a recognized certificate authority. After the client receives the RSA key certificates, it uses the certificate to validate the public key. Assuming that the public key is valid, the client then chooses a value, x, includes x as part of a ClientKeyExchange message, and encrypts the message with the server's RSA public key. The server receives the ClientKeyExchange message from the client and decrypts the message with the server's RSA private key in order to recover x. At this point, the client and the server both know the value of x. In theory, x could be used as the shared secret key for a symmetric encryption algorithm. More commonly, however, the chosen cipher suite uses x as a "pre-master secret," and applies an algorithm to x in order to derive the key from x. Since the chosen cipher suite is common to both the client and the server, both the client and the server know the algorithm and can thus derive the same key if they know the value of x. Following this key agreement procedure, the client and the server used their shared secret key to transmit encrypted and/or authenticated data between each other (e.g., using a symmetric encryption algorithm such as the Triple Data Encryption Standard algorithm ("3DES")). For example, if TLS/SSL is used to set up a secure channel in which a user can enter his or her credit card number into a browser and transmit the number safely to an e-commerce server, the credit card number would be encrypted using the shared secret key that was agreed to as part of the key agreement procedure.

A problem that arises in the key agreement procedure described above is that key agreement involves the server's using its RSA private key to decrypt the ClientKeyExchange message that contains x. The nature of the RSA technique is such that encryption is relatively efficient, but decryption is computationally expensive. Typical TLS/SSL servers (e.g., web servers used for e-commerce, password-based login, etc.) process hundreds or thousands of connections per minute. Having to perform an RSA decryption for every connection creates a bottleneck on the server that limits the number of connections that the server can handle. TLS/SSL servers often spend a large percentage of their computational capacity performing RSA decryption as part of the key agreement procedure.

The subject matter described herein may be used to relieve the bottleneck caused by performing RSA decryption on the server. According to the subject matter herein, in a TLS/SSL communication session (or in an extended or modified version of TLS/SSL that supports the techniques described herein), the client sends its public key to the server. The public key may be any type of public key, such as an RSA key, a Rabin cryptosystem key, etc. As described in greater detail below, the client may send its public key to the server as part of the ClientHello message, although there are other ways for the client to send its public key to the server. For example, the TLS protocol could be modified to allow for a message flow that explicitly supports sending a public key from the client to the server.

Once the server has the client's public key, the server chooses a value, x, which it encrypts with the client's public key. The value x is the basis for the shared secret that will later be used between the client and the server for encrypted communication—i.e., x either serves as the secret itself, or serves as a pre-master secret from which the actual encryption secret is derived. The server may also send, to the client, the server's certificated public key, and a digital signature calculated over at least the value x and some data that the server receives from the client, such as a random value that the client includes in the ClientHello message (or the digital signature may be calculated over some data that is derived from x and from the data that was received from the client). (The digital signature is calculated using the private key that corresponds the server's public key.) The server's public/private key pair could be any type of asymmetric key pair. However, in one example, since the server uses the private key to sign data, the key pair is chosen for use with a digital signing algorithm that allows the server to calculate a signature efficiently. (Examples of such algorithms are discussed below.)

The client receives the encrypted version of x, the server's public key and certificate, and the digital signature. The client then uses the certificate to validate the server's public key, and uses the public key to verify the signature. Assuming that the key is valid and the signature verifies against the signed data, the client uses its private key to decrypt the message that contains x. While decryption of x may involve a computationally-expensive operation, this operation is performed by the client instead of the server. Since many clients in TLS/SSL communications are personal devices (e.g., laptops, desktops, cell phones, etc.), these clients tend to have excess computational capacity, so distributing the expensive decryption operation to the client makes use of an otherwise unused resource. Moreover, to the extent that having the client perform the expensive decryption operation avoids having to do an expensive decryption operation on the server, some of the server's scarce resources are freed, thereby allowing a given piece of server hardware to handle more connections.

Figure 1:
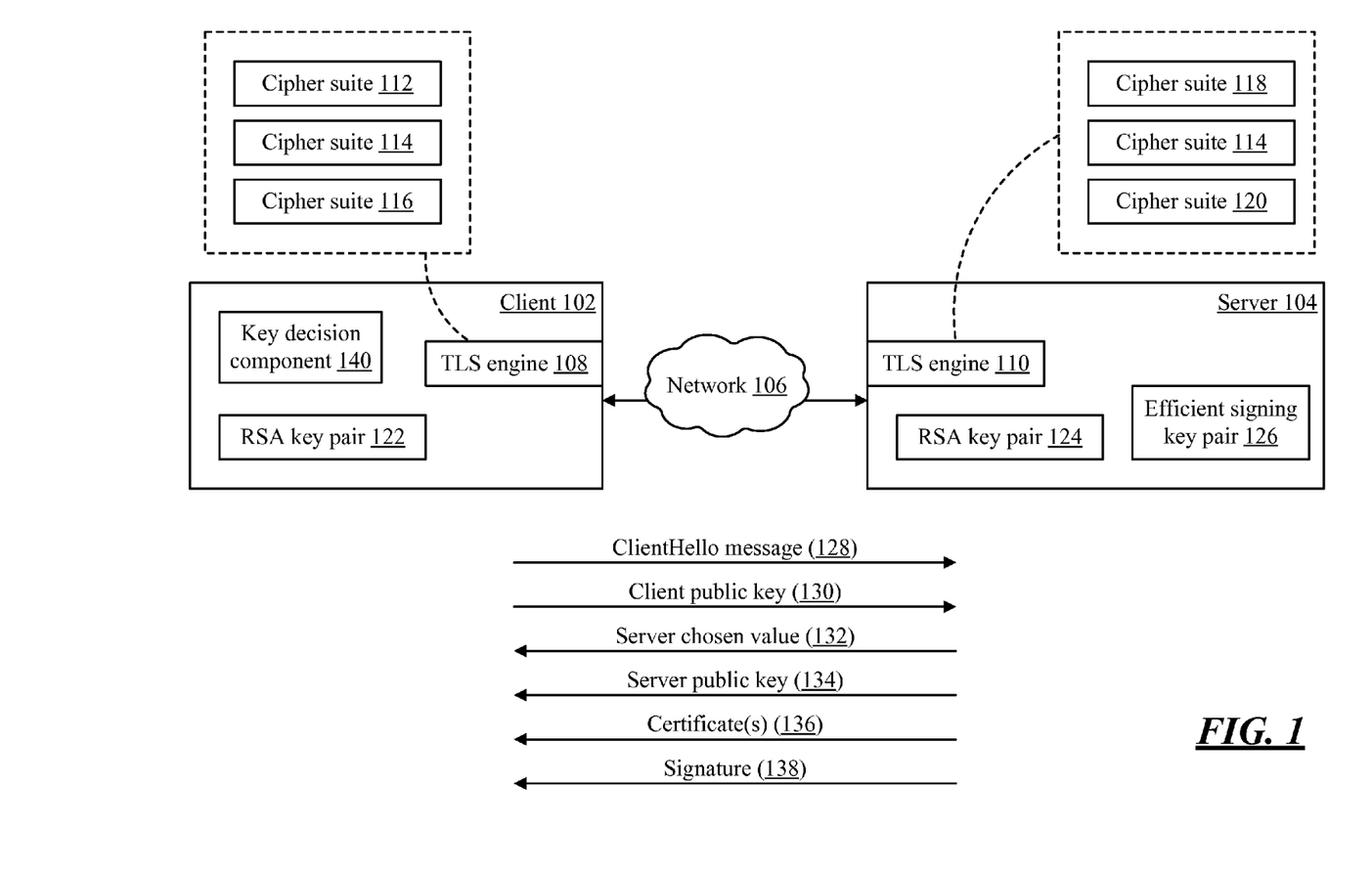
FIG. 1 is a block diagram of an example scenario in which TLS/SSL communications may occur.

Turning now to the drawings, FIG. 1 shows an example scenario in which TLS/SSL communications may occur. Client 102 and server 104 are communicatively connected to each other by network 106. Network 106 may be the Internet, may be a set of interconnected networks that comprises the Internet, or may be any other type of network. Server 104, in one example, is a web server that handles Hypertext Transfer Protocol Secure (HTTPS) connections. However, TLS/SSL can be implemented by any type of server and can be used for any type of communication. A web server is only one example of the type of server that uses TLS/SSL, and HTTPS is merely one example application of TLS/SSL. Client 102 may be any type of device that communicates with server 104 via TLS/SSL. For example, client 102 may be a personal desktop or laptop computer, a handheld computer, a wireless telephone, a set-top box, or any other type of device. ("Client 102" may refer to a particular device, or may refer to the client software that executes on such a device. Similarly, "server 104" may refer to a particular device, or may refer to server software that executes on that device.)

Client 102 comprises, or otherwise make use of, TLS engine 108, which implements the TLS protocol. Likewise server 104 comprises, or otherwise makes use of, TLS engine 110. (Since TLS has superseded SSL, for brevity we refer to engines 108 and 110 as a "TLS" engines; however, it will be appreciated that the techniques described herein may be applied to the older SSL protocol, or even to other cryptographic communication protocols.) Each of TLS engines 108 and 110 supports one or more cipher suites. Each cipher suite specifies, among other things, a particular procedure for key agreement. TLS engine 108 supports cipher suites 112, 114, and 116, and TLS engine 110 supports cipher suites 114, 118, and 120. In theory, if two TLS engines do not have in common any cipher suite that they both support, then the two TLS engines would be unable to participate in a TLS communication with each other. In the example of FIG. 1, TLS engines 108 and 110 both support cipher suite 114, and thus TLS engines 108 and 110 are able to participate in a TLS communication session using that cipher suite.

Each client or server that is able to participate in a TLS/SSL communication session may be associated with one or more key pairs. In the example of FIG. 1, client 102 is associated with RSA key pair 122, and server 104 is associated with RSA key pair 124. (The use of RSA key pairs is merely an example; key pairs 122 and 124 could be any type of key pair, and are not necessarily the same type as each other.) Server 104 may also include an efficient signing key pair 126. There are various digital signature algorithms that allow digital signatures to be created and/or verified efficiently. Efficient signing key pair 126 may be a key pair for use with one of these algorithms. Examples of efficient signing algorithms are described below, although the subject matter herein is not limited to any particular algorithm.

The following is a description of some messages that may be exchanged by client 102 and server 104 when they agree to a key in a communication session according to an extended or modified version of TLS/SSL. According to TLS/SSL, client 102 sends a ClientHello message 128 to server 104. Client 102 may also send a client public key 130 (e.g., the public portion of client 102's RSA key pair 122) to server 104. Client 102 may either send, or not send, public key 130 to server 104 depending on circumstances, and client 102 may employ a key decision component 140 to determine whether to send client pubic key 130 to server 104. (An example algorithm that key decision component 140 may use to determine whether to send client public key 130 is discussed below in connection with FIG. 4.) As noted above, there are various ways in which client 102 may send client public key 130 to server 104. In one example, client public key 130 is included in ClientHello message 128. (TLS/SSL allows some arbitrary data to be included in a ClientHello message.) In another example, the TLS standard itself could be modified to allow for the transmission of a public key by the client to the server. The subject matter herein is not limited to any particular way of communicating client public key 130 from the client to the server. It is noted that, if the client sends its public key, it could also send a certificate of that public key. Then, if the server wants to authenticate the client, the server can do so through the client's public key certificate.

At some point in time, server 104 chooses a value (e.g., the value x, described above). Server 104 could choose this value in any unpredictable manner—e.g., through a pseudo-random number generator. Server 104 then communicates, to client 102, information that may comprise an encrypted version of the server's chosen value 132, a server public key 134, certificate(s) 136 for server public key 134, and a signature 138. This information could be included as part of one message, although the information could be sent in any manner. Server public key 134 may be the public portion of one of server 104's key pairs, such as efficient signing key pair 126. Certificate(s) 136 may trace the pedigree of public key 134 back to a certificate authority, thereby allowing server public key 134 to be validated by client 102. Signature 138 is a signature calculated over the information that server 104 sends to client 102—e.g., signature 138 may be calculated over a message containing the encrypted version of the server's chosen value 132, server public key 134, and certificate(s) 136—as well as some unpredictable information that the server received from the client (as a guard against replay attacks). (Rather than signing the above-mentioned information directly, the server could sign some data that is derived from that information—as long as the client and server can both use the same derivation algorithm. The notion of data being "derived from" information includes the case where the derived data is the original information itself, since applying the identity function can be considered a kind of derivation.) Signature 138 is calculated using the private key that corresponds to server public key 134, so that client 102 can verify the signature using the public key that client 102 receives from server 104.

After client 102 receives the above information from server 104, client 102 may validate server public key 134 using certificate(s) 136. Assuming that server public key 134 is valid, client 102 uses server public key 134 to verify signature 138. If signature 138 verifies correctly, the client 102 uses client 102's private key to decrypt the server's chosen value 132. For example, if the client public key 130, which client 102 sent to server 104, is the public portion of client 102's RSA key pair 122, then the private key used for decryption is the private portion of RSA key pair 122.

Figure 2:
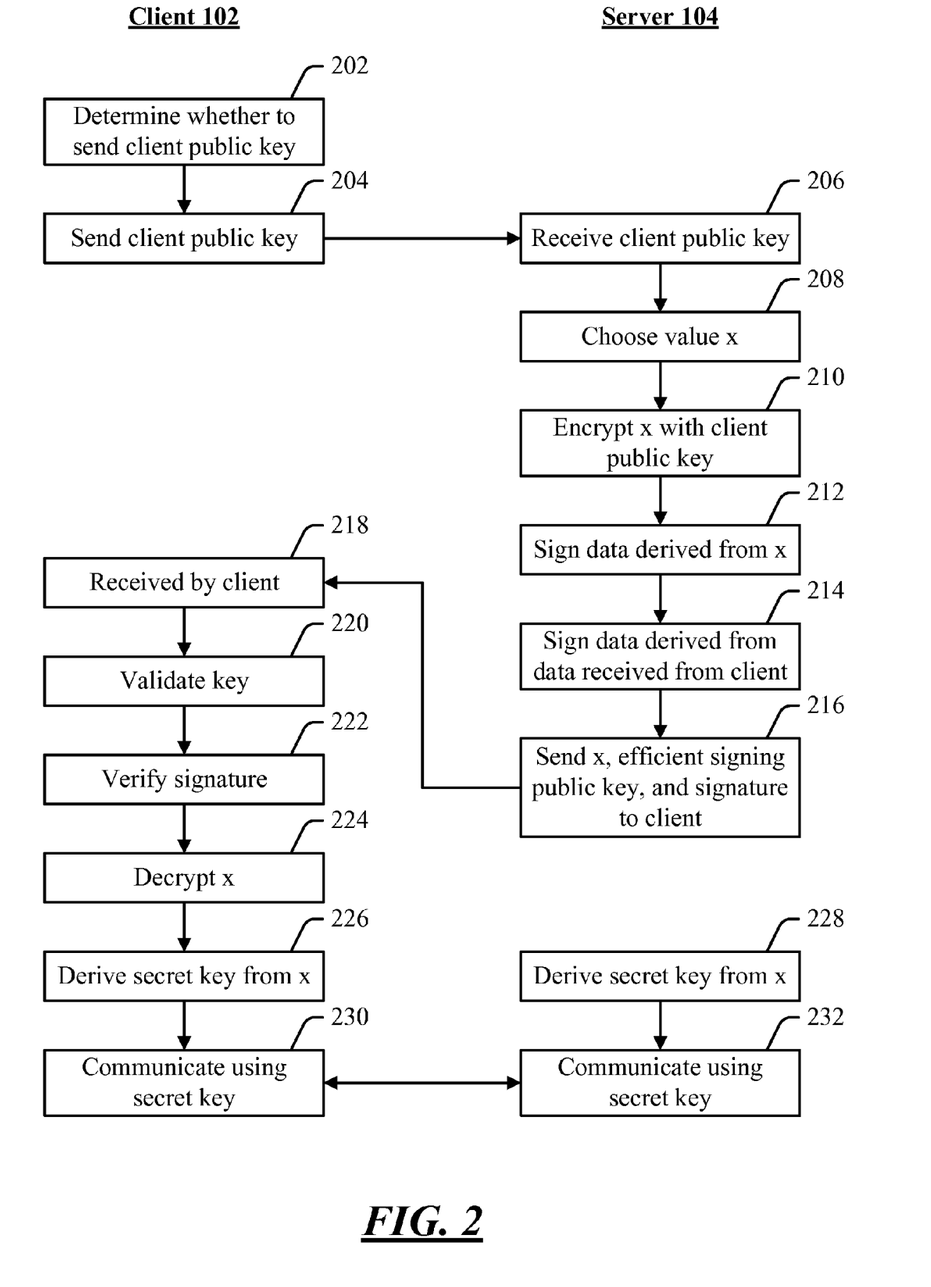
FIG. 2 is a flow diagram of an example process in which two participants in a communication may agree upon, and use, a key.
Figure 4:
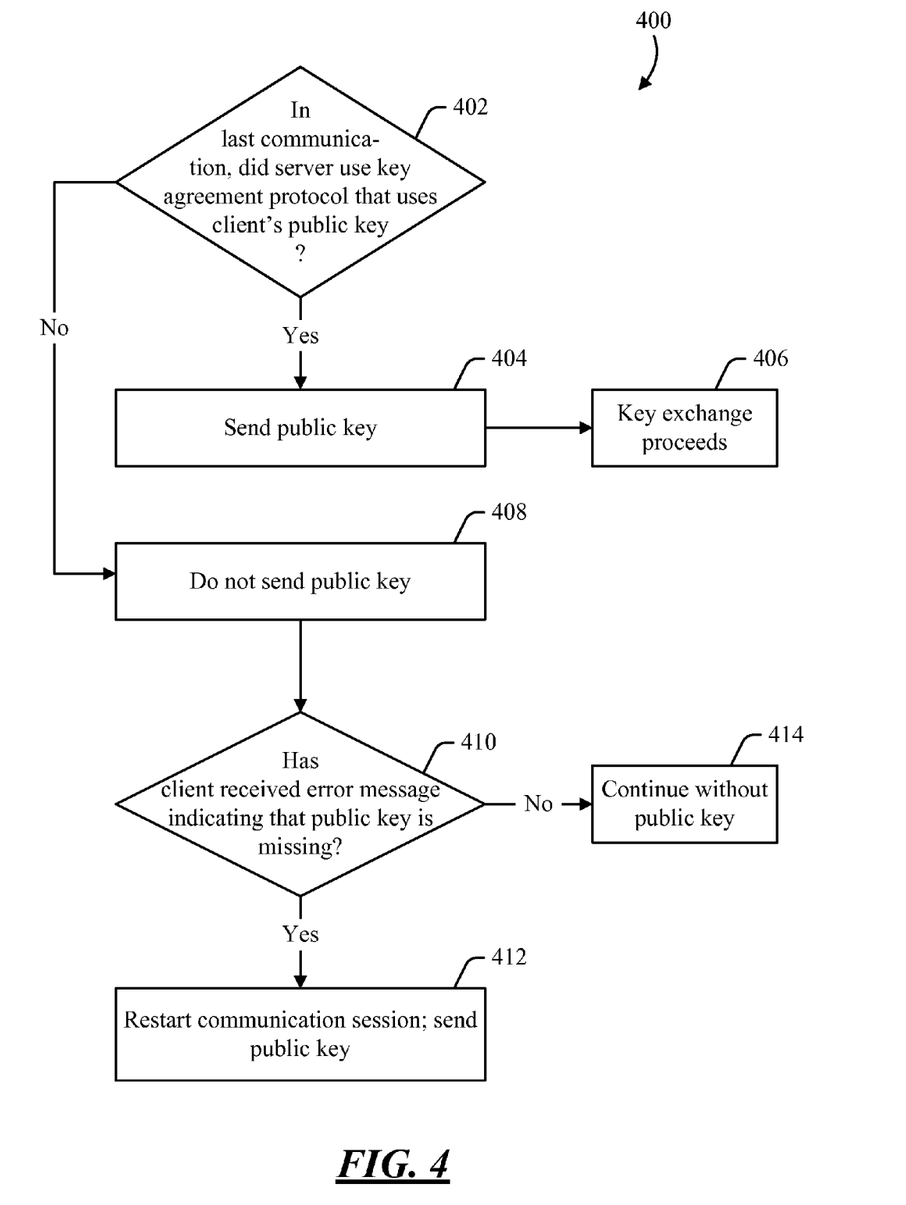
FIG. 4 is a flow diagram of an example process of deciding whether to send a public key to a server.

FIG. 2 shows an example process in which two participants in a communication may agree upon, and use, a key. Before turning to a description of FIG. 2, it is noted that the flow diagrams contained herein (both in FIG. 2 and in FIG. 4) are described, by way of example, with reference to components shown in FIG. 1, although these processes may be carried out in any system and are not limited to the scenario shown in FIG. 1. Additionally, each of the flow diagrams in FIGS. 2 and 4 shows an example in which stages of a process are carried out in a particular order, as indicated by the lines connecting the blocks, but the various stages shown in these diagrams can be performed in any order, or in any combination or sub-combination.

In the example of FIG. 2, actions shown on the left may be performed by client 102, and actions shown on the right may be performed by server 104.

At 202, client 102 determines whether to send its public key to the server. As noted above, some servers may have the cipher suite that allows them to perform the key agreement procedure using the client's public key, while others may only have cipher suites that perform traditional key agreement in which the server's public key is used to transmit the shared secret or pre-master secret. If server 104 does not have the cipher suite that allows it to use client 102's public key, then for client 102 to transmit its public key is a waste of bandwidth. Thus, client 102 determines at 202 whether to transmit its public key to server 104. Client 102 may use a heuristic to determine whether server 104 is likely to be able to use the client's public key. FIG. 4, which is discussed below, shows an example process of determining, according to one example heuristic, whether to transmit the key.

If client 102 determines to send its public key, then the public key is sent at 204, and is then received, at 206, by server 104. The client's public key may be sent in any manner. In one example, as described above, the client's public key may be sent as part of a ClientHello message in a TLS protocol, as part of some other message that might be supported in a modified version of the TLS protocol, or as part of a message in some other communication protocol. The client's public key may be sent in any manner, and the subject matter herein is not limited to any particular manner of sending the key.

The following is a description of actions that are performed if server 104 has a cipher suite that is able to use the public key that client 102 sent to server 104. If server 104 is not able to use the public key, then key agreement may proceed according to a different procedure.

At 208, server 104 chooses a value, x. The value x, as described above is a secret that is either used as an encryption key for exchange of data between client 102 and server 104, or is a pre-master secret from which the shared secret encryption key is derived. The particular way in which x is used depends on the cipher suite that client 102 and server 104 are using.

At 210, server 104 encrypts x with the public key that it received from client 102, thereby producing an encrypted version of the value x. At 212, server 104 signs data derived from x (where the "data derived from x" may be x itself, the encrypted version of x, or some other derivation from x). The signature is calculated using a private key associated with server 104. Server 104, as noted above, may be associated with several different key pairs. The key pair that is chosen for the signing may be one that is designed for use with an efficient signing algorithm (e.g., the chosen key pair may be efficient signing key pair 126, shown in FIG. 1). At 214, server 104 signs data derived from a piece of data that the server received from the client—e.g., server 104 may sign data derived from the random value included in the ClientHello message (where the "data derived from the random value" may be the random value itself, or may be some other value derived from that value). At 216, server 104 sends the encrypted version of x, the server's public key, and the signatures, to client 102. This information is received by the client at 218. In the above description, server 104 signs the encrypted version of x and the server's public key separately. However, in another example, these data may be included in a single message, and a single signature may be calculated over the message.

Regarding the key that the server uses to sign x and its public key, it is noted that there are various asymmetric-key-based signing algorithms that are more efficient than the traditional RSA signing method. The subject matter herein is not limited to any particular signing technique. However, inasmuch as one might want to reduce the amount of computation to be performed on the server, an efficient signing algorithm may be chosen. Some examples of efficient signing algorithms are described below.

One example of an efficient signing algorithm is the Feige-Fiat-Shamir ("FFS") signature scheme derived from the FFS identification protocol. The FFS protocol is typically described with a public exponent of two. It can also use larger public exponents such as three, which may have some value when using existing RSA public keys, or when using infrastructures designed to set up RSA public keys. However, larger public exponents are somewhat less efficient.

To create a FFS signature the signer has to multiply a number of values together. The number of multiplications to be performed is a constant plus the number of bits that are set to one in the challenge value. A typical implementation of FFS would use a 256-bit challenge vector, so on average the signer has to perform about 128 modular multiplications.

The security of the FFS scheme holds as long as there are enough distinct challenge vectors. As noted above, in the key agreement protocol described herein the server has to sign certain values (or has to sign a message containing those values). If FFS is to be used for the signing, then the amount of time that it takes to generate a signature is proportional to the number of multiplications to be performed, so it makes sense to reduce the number of set bits in the challenge vector in order to reduce the number of multiplications. Thus, instead of using a 256-bit vector and using all $2^{256}$ possible values, one can use a larger challenge vector and only use those values that have low Hamming weight (i.e., values having a representation in the vector in which no more than some number of bits are set). For example, if the vector is 512 bits long then there are more than $2^{256}$ different challenge vectors that have no more than 58 bits set. Representing the challenge vectors in this way thus reduces the number of multiplications to be performed in calculating an FFS signature from about 128 to about 58. In the FFS signature scheme, the challenge is generated by hashing the witness and the message to be signed. The result of the hash can be mapped to a low-Hamming-weight challenge vector using some documented algorithm that all parties know.

Taking this example further, if the challenge vector is 8192 bits long then there are more than $2^{256}$ vectors with at most 27 bits set. This reduces the number of multiplications down to around 27 or so. In general, to reduce the number of multiplications to be performed in a signature calculation, one may attempt to encode a message represented by an n-bit vector into an m-bit vector where no more than k bits of the m-bit vector are set to one, where k<n<m (where appropriate values of n, m, and k are chosen).

Full general encoding of $2^{256}$ values into 8192-bit vectors of weight 27 can be somewhat complicated. A simpler solution, involving only a slight increase in the number of bits set, is to divide the 8192-bit vector into 32 segments of 256 bits each and to select exactly one bit to be set in each segment. In effect, each 256-bit segment is a unary number in the range [0,255], where the number that is represented by the segment is identified by the offset of the single bit that is set in the segment. Each segment can represent 256 different values and there are 32 segments, so the total number of values that can be represented in this manner is $256^{32}$, which is equal to $2^{256}$. Thus, $2^{256}$ different challenge values can be represented in vectors that have only 32 bits set, thereby allowing FFS signatures to be calculated in time proportional to 32 multiplications.

Figure 3:
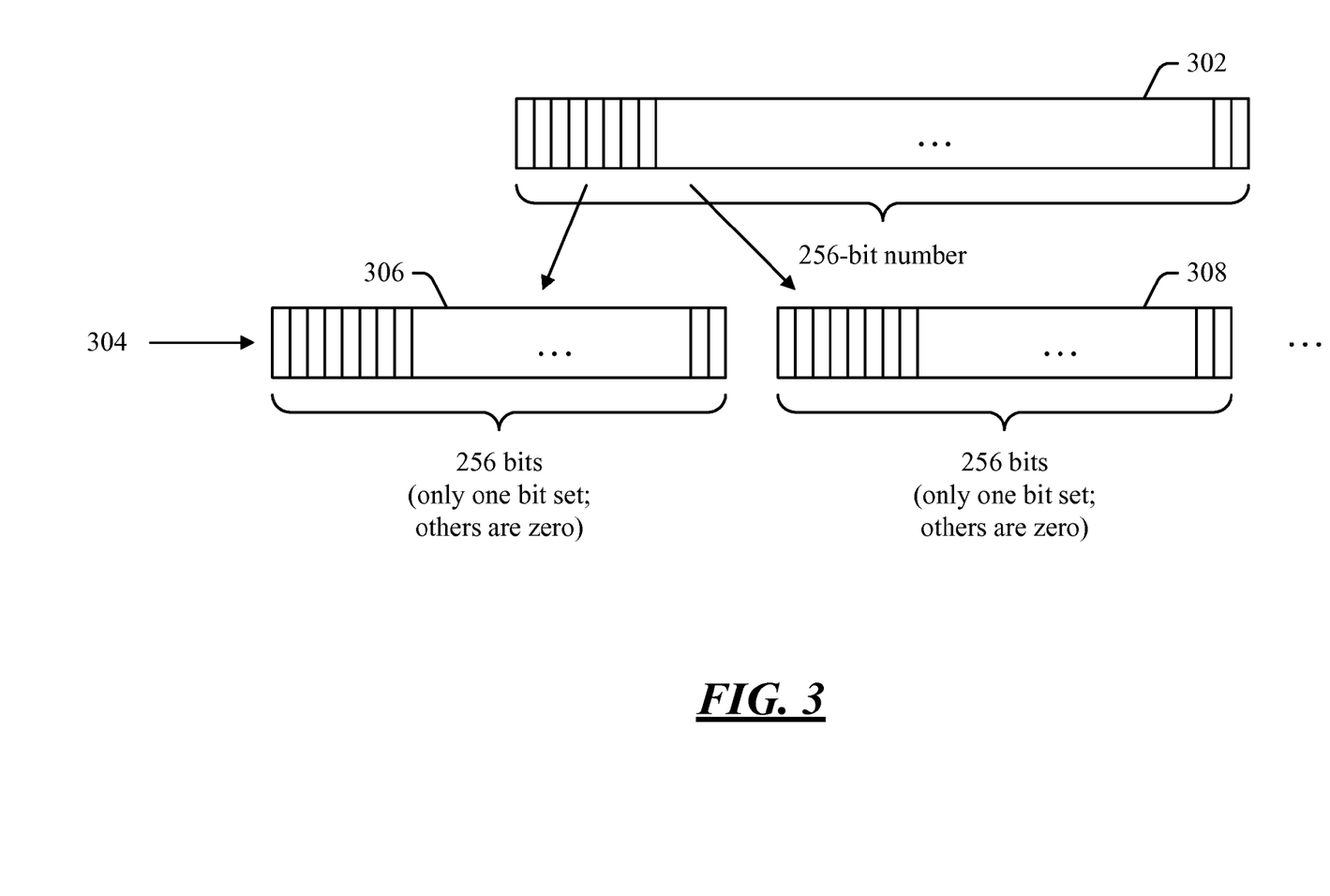
FIG. 3 is a block diagram of an example sparse encoding scheme.

The sparse encoding of $2^{256}$ different values into 8192-bit vectors is shown pictorially in FIG. 3. Vector 302 is a 256-bit number. Any of the bits in vector 302 may be set to one or zero, so vector 302 is a dense encoding of a 256-bit number. Vector 304 is an 8192-bit vector into which vector 302 is to be encoded. Vector 302 may be viewed as a concatenation of thirty-two 256-bit vectors (of which two vectors 306 and 308 are shown as examples). Each of the thirty-two 256-bit vectors that make up vector 304 may have exactly one bit set. Each of these vectors corresponds to an 8-bit segment of vector 302. Each 8-bit segment of vector 302 can represent $2^8$=256 different values. Thus, in vector 306, exactly one of the 256 bits is set based on which of the 256 different values is represented by the first eight bits in vector 302. (E.g., if the value represented by the first eight bits of vector 302 is 00000101 [=5, in decimal], then the fifth bit of vector 302 might be set to one, and all other bits in that vector might be set to zero.) Similarly, in vector 308, exactly one of the 256 bits is set based on which of the 256 different values is represented by the second group of eight bits in vector 302. And so on, for all thirty-two 8-bit segments of vector 302. In greater generality, given an n-bit message, the message may be divided into segments that are b bits long (where the number of such segments that exist in the n-bit message is d). Each b-bit segment can represent $2^b$ different values, so a vector that is $2^b$ bits long can represent all $2^b$ different values with exactly one bit set (where the offset of the set bit determines which value is represented by the $2^b$-bit vector). Thus, an m-bit vector made up of d vectors that are each $2^b$ bits long may be used to represent the original n-bit message. In the specific example of FIG. 3, n=256, d=32, b=8, and m=8192; however, other values could be chosen. FIG. 3 shows one example of a sparse encoding scheme, although other sparse encoding schemes may be used.

In one example use of the FFS algorithm, the signer may choose the modulus N, which is in line with generic public-key use. It also allows the signer to store the factorization of N and use the Chinese Remainder Theorem to perform the multiplications, which is a relatively efficient way to calculate the signature.

FFS implementations involve creating a set of secret numbers (typically referred to by the notation $v_i$), and these numbers are often documented as being part of the public key. However, including these numbers in the public key makes the public key unnecessarily large. In order to reduce the size of the public key, P, the $v_i$ values may be generated using a function $f$, so $v_i=f(P,i)$, where P is the public key that contains the modulus N, optionally a public exponent e, and optionally some other data used to derive the $v_i$ values. Generating the $v_i$ values this way reduces the size of the public key to the modulus N plus a few bits per $v_i$ value.

As an optimization, the signer can dynamically choose the size of the challenge vector. This allows the signer to perform a trade-off between pre-computation cost (for the roots on the $v_i$ values), storage size of the private key, and cost of calculating the signature. However, the signature has to include the challenge vector size, and the mapping to low Hamming-weight vectors has to be flexible in its output size.

FFS is one example of an efficient signature scheme. Another example is the Guillou-Quisquater ("GQ") signature scheme. If GQ is used, the signer may generate its own modulus N as the product of two primes P and Q, which allows the signer to use the Chinese Remainder Theorem for improved efficiency.

Returning now to the description of FIG. 2, at 220 client 102 validates the server's public key. For example, client 102 may check the key's certificate chain to trace the certificate of the key back to a recognized certificate authority. Assuming the key can be validated, at 222 the client verifies the signature(s) that were received from the server. Assuming that the signatures on the data received from the server verify correctly, client 102 recovers x by decrypting the message that contains x (at 224). At this point, x is known to both client 102 and server 104. As noted above, client 102 and server 104 could use x as a shared secret for encryption and/or authentication. Or, client 102 and server 104 could both derive the secret key from x (at 226 and 228, respectively). The algorithm that would be used to derive x may be part of the cipher suite that client 102 and server 104 have in common, and thus both client 102 and server 104 can apply the same algorithm to x in order to derive the shared encryption secret.

At 230 and 232, client 102 and server 104 use their shared encryption secret to engage in communication of encrypted data.

As noted above, client 102 may decide whether to send its public key to the server. FIG. 4 shows an example process 400 by which such a decision may be made. In general, process 400 implements the heuristic that a server is likely to use the client's public key as part of the key agreement protocol if the server did so the last time the client made contact with that server. Conversely, the server is unlikely to use the client's public key if it did not do so the last time the client made contact with that server.

At 402, the client determines whether, in the last communication with a particular server, that server used a key agreement protocol that made use of the client's public key. If the server did use such a protocol, then the client assumes that the server would be able to use that protocol again, so it sends the public key to the server (at 404), and the key exchange proceeds (at 406). The key exchange procedure that is actually performed at 406 depends on the cipher suite that the server chooses. The server may or may not choose a cipher suite that performs key agreement using the client's public key, but if the server does choose such a cipher suite, the server will have the client's public key.

If it was determined at 402 that the server did not use a key agreement protocol that used the client's public key at the time of the last contact, then it is assumed that the server would not use the client's public key in the current contact, so the client's public key is not sent (at 408). (If the client has not made previous contact with the server, then some disambiguation rule has to be used to determine whether to send the key. For example, a rule might call for the key to be sent whenever the client is making its first contact with a particular server.)

Although the key was not sent at 408, it is possible that the server would choose a cipher suite that uses the client's public key. Thus, when the client chooses not to send its public key, the client has to have a way of dealing with the possibility that it made the wrong choice. In one example, if the server chooses a cipher suite that uses the client's public key but does not receive the key, then the server could generate an error message indicating that the client's public key is missing. The client can listen for such an error message. If such an error message is receive by the client (as determined at 410), then the client may restart the communication session, but this time may send its public key to the server (at 412). On the other hand, if no such error message is received, then the client and server can continue with their key agreement procedure without the client's public key (at 414).

The heuristic implemented by the process of FIG. 4 is an example way of determining that the server is likely to use the client's public key (or, more precisely, that the likelihood of using the key exceeds some threshold level). However, any heuristic may be used to decide whether a client will send its public key to the server.

Figure 5:
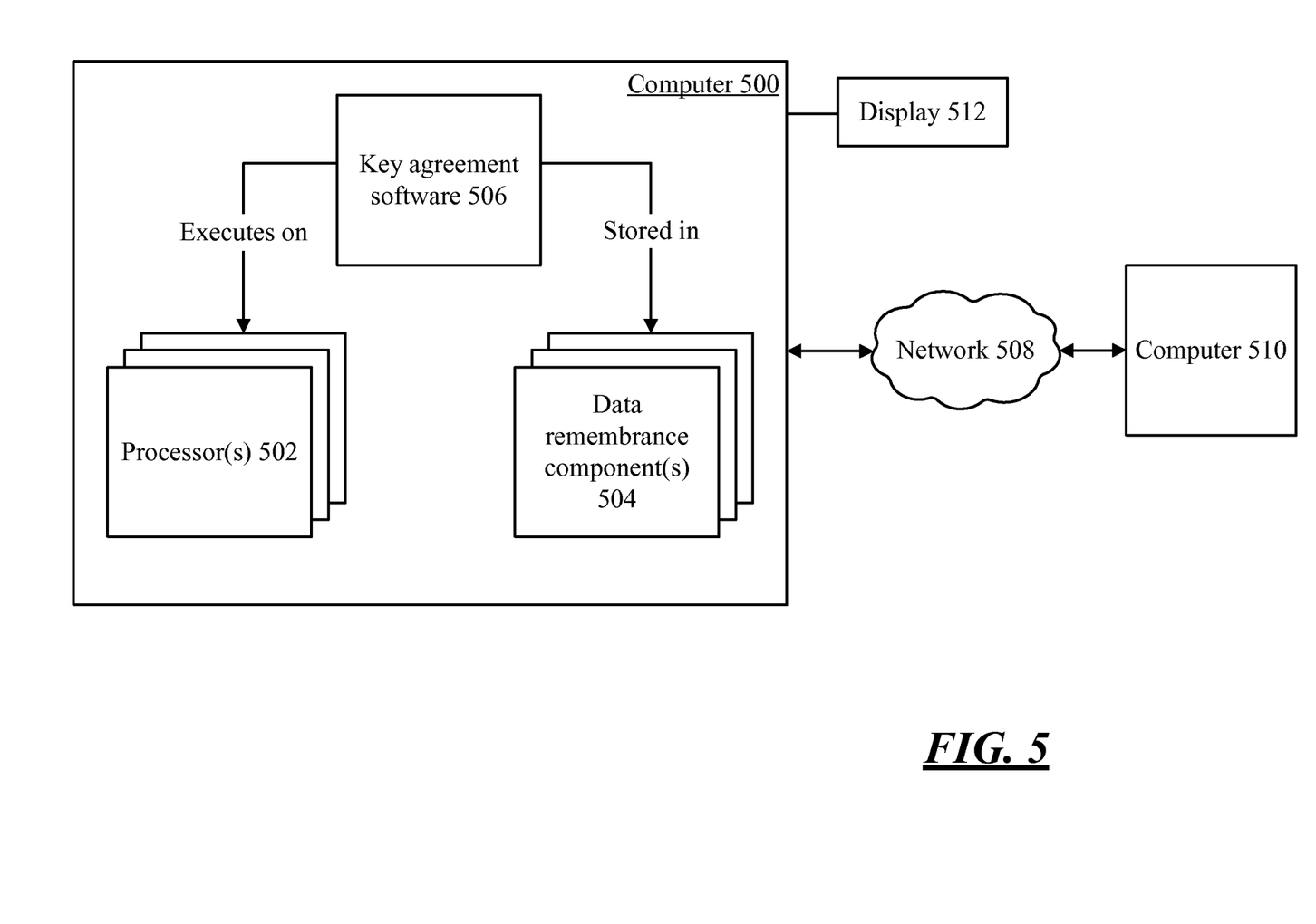
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is key agreement software 506, which may implement some or all of the functionality described above in connection with FIGS. 1-3, although any type of software could be used. Software 506 may be implemented, for example, through one or more components, which may be components in a distributed system, separate files, separate functions, separate objects, separate lines of code, etc. A computer or other device (e.g., personal computer, server computer, handheld computer, cell phone, etc.) in which a program is stored on hard disk, loaded into RAM, and executed on the computer's processor(s) typifies the scenario depicted in FIG. 4, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of participating in communication with a client, the method comprising:
   using a processor to perform acts comprising:
      receiving, at a server, a first public key from a client;
      choosing a first value;
      encrypting said first value with said first public key of said client to produce an encrypted value;
      using a key pair of said server to sign (a) said encrypted value, or a second value derived from said encrypted value and (b) data received by said server from said client, or a third value derived from said data, thereby creating a signature;
      sending said encrypted value, a second public key of said key pair, and said one or more signatures to said client; and
      engaging in encrypted communication with said client using a secret key that comprises, or is derived from, said first value,
   wherein creation of said one or more signatures is performed with a first algorithm in which a number of multiplications to be performed is determined by a number of bits set to one in a fourth value that is derived from the data to be signed, and wherein said acts further comprise:
      creating an n-bit fifth value that is derived from said fourth value;
      encoding said n-bit fifth value in an m-bit encoding in which no more than k bits are set to one, wherein $k<n<m$;
   wherein at least one of said one or more signatures is calculated using said m-bit encoding.

2. The method of claim 1, wherein said use of said key pair to sign is performed using a Feige-Fiat-Shamir signature scheme.

3. The method of claim 1, wherein said use of said key pair to sign is performed using a Guillou-Quisquater signature scheme.

4. The method of claim 1, wherein said first public key is received by said server as part of a ClientHello message in a TLS communication session.

5. The method of claim 1, wherein said server supports a plurality of cipher suites, wherein each of said cipher suites implements a particular procedure of key agreement between said server and said client, and wherein said acts further comprise:
   receiving, at said server from said client, a list of one or more cipher suites that said client requests to use;
   identifying, from said list, a first one of said cipher suites that said server supports, said first one of said cipher suites implementing a key agreement procedure that makes use of said first public key from said client as part of its key agreement procedure, said server also supporting at least one cipher suite that does not make use of said first public key from said client as part of its key agreement procedure; and
   communicating to said client that said first one of said cipher suites has been chosen.

6. The method of claim 1, wherein said secret key is derived from said first value, and wherein said acts further comprise:
   determining a choice of cipher suite to use for communication with said client, said cipher suite defining a second algorithm that is used to derive said secret key from said first value;
   communicating said choice of cipher suite to said client; and
   using said second algorithm to derive said secret key from said first value.

7. A method of participating in communication with a client, the method comprising:
   using a processor to perform acts comprising:
      receiving, at a server, a first public key from a client;
      choosing a first value;
      encrypting said first value with said first public key of said client to produce an encrypted value;
      using a key pair of said server to sign (a) said encrypted value, or a second value derived from said encrypted value and (b) data received by said server from said client, or a third value derived from said data, thereby creating a signature;
      sending said encrypted value, a second public key of said key pair, and said one or more signatures to said client; and
      engaging in encrypted communication with said client using a secret key that comprises, or is derived from, said first value,
   wherein creation of said one or more signatures is performed with a first algorithm in which a number of multiplications to be performed is determined by a number of bits that are set to one in a fourth value that is derived from the data to be signed, and wherein said acts further comprise:
      creating an n-bit fifth value that is derived from the data to be signed, wherein the data to be signed comprises, or is derived from, said encrypted value;
      dividing said n-bit fifth value into d segments of b bits each;
      creating an m-bit encoding that comprises d blocks each of which has $2^b$ bits; and
      for each of the d blocks in the m-bit encoding, setting exactly one of the bits in the block to one based on a corresponding b-bit segment in the n-bit fifth value, wherein at least one of said one or more signatures is calculated on said m-bit encoding.

8. The method of claim 7, wherein said use of said key pair to sign is performed using a Feige-Fiat-Shamir signature scheme.

9. The method of claim 7, wherein said use of said key pair to sign is performed using a Guillou-Quisquater signature scheme.

10. The method of claim 7, wherein said first public key is received by said server as part of a ClientHello message in a TLS communication session.

11. The method of claim 7, wherein said server supports a plurality of cipher suites, wherein each of said cipher suites implements a particular procedure of key agreement between said server and said client, and wherein said acts further comprise:
   receiving, at said server from said client, a list of one or more cipher suites that said client requests to use;
   identifying, from said list, a first one of said cipher suites that said server supports, said first one of said cipher suites implementing a key agreement procedure that makes use of said first public key from said client as part of its key agreement procedure, said server also supporting at least one cipher suite that does not make use of said first public key from said client as part of its key agreement procedure; and
   communicating to said client that said first one of said cipher suites has been chosen.

12. The method of claim 7, wherein said secret key is derived from said first value, and wherein said acts further comprise:
   determining a choice of cipher suite to use for communication with said client, said cipher suite defining a second algorithm that is used to derive said secret key from said first value;
   communicating said choice of cipher suite to said client; and
   using said second algorithm to derive said secret key from said first value.

13. One or more computer-readable memories that store executable instructions to participate in communication with a client, executable instructions, when executed by a computer, causing the computer to perform acts comprising:
   receiving, at a server, a first public key from a client;
   choosing a first value;
   encrypting said first value with said first public key of said client to produce an encrypted value;
   using a key pair of said server to sign (a) said encrypted value, or a second value derived from said encrypted value and (b) data received by said server from said client, or a third value derived from said data, thereby creating a signature;
   sending said encrypted value, a second public key of said key pair, and said one or more signatures to said client; and
   engaging in encrypted communication with said client using a secret key that comprises, or is derived from, said first value,
wherein creation of said one or more signatures is performed with a first algorithm in which a number of multiplications to be performed is determined by a number of bits set to one in a fourth value that is derived from the data to be signed, and wherein said acts further comprise:
   creating an n-bit fifth value that is derived from said fourth value;
   encoding said n-bit fifth value in an m-bit encoding in which no more than k bits are set to one, wherein $k<n<m$;
wherein at least one of said one or more signatures is calculated using said m-bit encoding.

14. The one or more computer-readable memories of claim 13, wherein said use of said key pair to sign is performed using a Feige-Fiat-Shamir signature scheme.

15. The one or more computer-readable memories of claim 13, wherein said use of said key pair to sign is performed using a Guillou-Quisquater signature scheme.

16. The one or more computer-readable memories of claim 13, wherein said first public key is received by said server as part of a ClientHello message in a TLS communication session.

17. The one or more computer-readable memories of claim 13, wherein said server supports a plurality of cipher suites, wherein each of said cipher suites implements a particular procedure of key agreement between said server and said client, and wherein said acts further comprise:
   receiving, at said server from said client, a list of one or more cipher suites that said client requests to use;
   identifying, from said list, a first one of said cipher suites that said server supports, said first one of said cipher suites implementing a key agreement procedure that makes use of said first public key from said client as part of its key agreement procedure, said server also supporting at least one cipher suite that does not make use of said first public key from said client as part of its key agreement procedure; and
   communicating to said client that said first one of said cipher suites has been chosen.

18. The one or more computer-readable memories of claim 13, wherein said secret key is derived from said first value, and wherein said acts further comprise:
   determining a choice of cipher suite to use for communication with said client, said cipher suite defining a second algorithm that is used to derive said secret key from said first value;
   communicating said choice of cipher suite to said client; and
   using said second algorithm to derive said secret key from said first value.

* * * * *